United States Patent [19]

Disler et al.

[11] Patent Number: 4,865,337
[45] Date of Patent: Sep. 12, 1989

[54] CONVERTIBLE MULTI-PURPOSE TOY

[75] Inventors: Martin R. Disler, 17 Wolsey Mews, Kentish Town, London, NW5 2DX; Federico D. de la Pena, London, both of Great Britain

[73] Assignee: Martin Robert Disler, Great Britain

[21] Appl. No.: 104,864

[22] Filed: Oct. 5, 1987

[30] Foreign Application Priority Data

Oct. 7, 1986 [GB] United Kingdom ................. 8624009
Feb. 11, 1987 [GB] United Kingdom ................. 8703141

[51] Int. Cl.$^4$ ............................................. B62K 5/06
[52] U.S. Cl. ..................... 280/7.1; 280/7.15; 280/47.18; 280/47.26; 280/278; 280/287; 403/22; 403/282; 403/368; 446/94; 446/465
[58] Field of Search ............... 280/7.1, 7.11, 7.15, 280/7.17, 1.188, 47.33, 47.18, 47.26, 278, 279, 282, 287; 446/94, 95, 96, 121, 122, 465, 469; 403/21, 22, 280, 282, 326, 328, 368, 378

[56] References Cited

U.S. PATENT DOCUMENTS

| | | | |
|---|---|---|---|
| 1,218,943 | 3/1917 | Hudry | 280/7.17 |
| 1,387,215 | 8/1921 | Wagner | 280/279 |
| 1,484,876 | 2/1924 | Dobrowolski | 280/7.17 |
| 1,506,565 | 8/1924 | Clatworthy | 280/7.15 |
| 2,798,727 | 7/1957 | Jensen et al. | 280/7.17 |
| 3,233,942 | 2/1966 | Creutz | 446/94 |
| 3,592,487 | 7/1971 | Mansperger | 280/282 |
| 4,705,284 | 11/1987 | Stout | 280/282 |

FOREIGN PATENT DOCUMENTS

| | | | |
|---|---|---|---|
| 424169 | 8/1947 | Italy | 446/94 |
| 78010 | 1/1951 | Norway | 280/7.1 |

Primary Examiner—Charles A. Marmor
Assistant Examiner—Eric Culbreth
Attorney, Agent, or Firm—Wood, Herron & Evans

[57] ABSTRACT

A kit of parts for assembling a number of toy vehicles having at least a bucket, two spine members with each having one portion of its length extending at an angle to the other, a support member, three wheels each with an axle therefor, and connectors for all these parts. The parts are all so constructed that they may be assembled together by use of the connectors to form at least a tricycle and a wheelbarrow. At least one of the spine members and the support member is capable of assembly in at least two different positions relative to the bucket to create the differing toys. The kit includes only a relatively small number of parts but is versatile because of the ability of certain parts to perform at least two different functions.

20 Claims, 13 Drawing Sheets

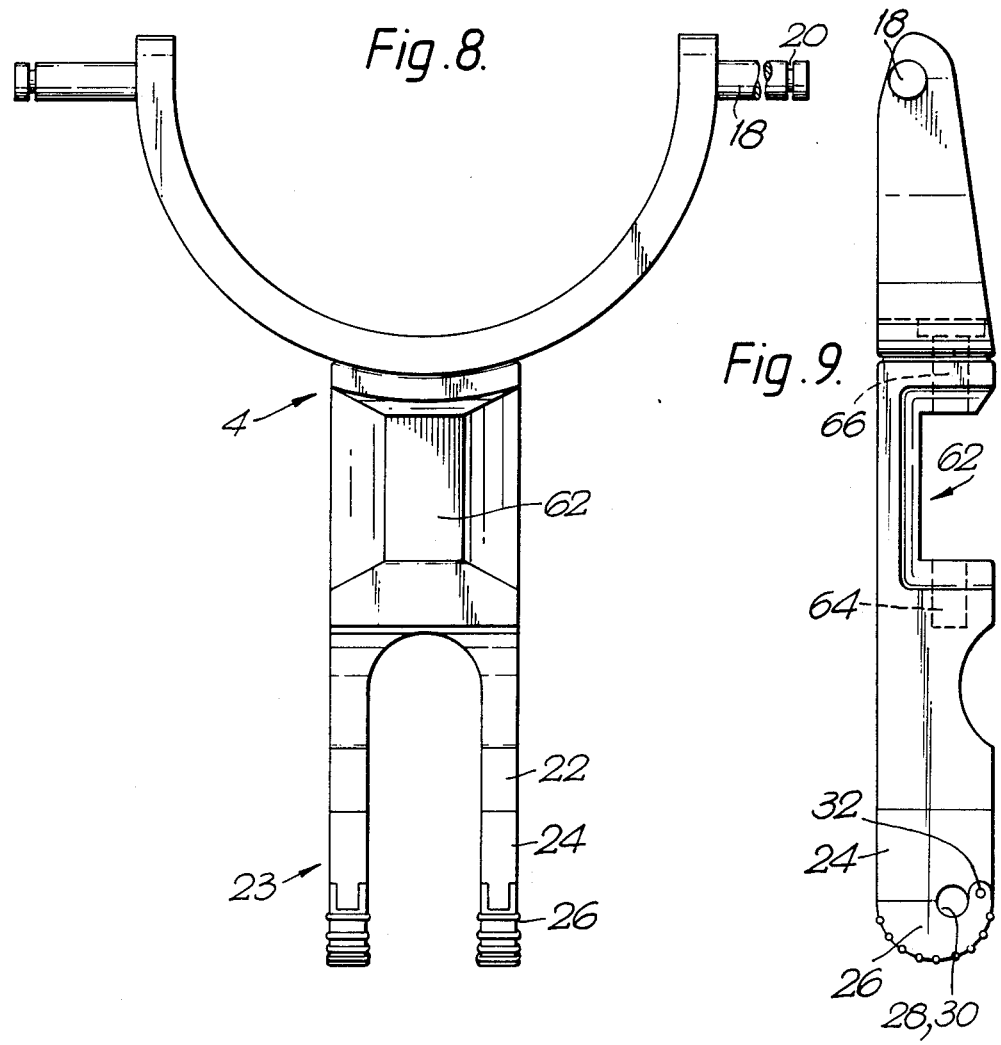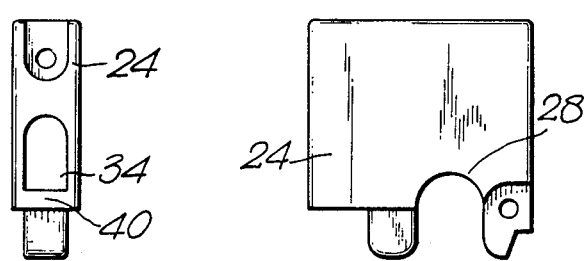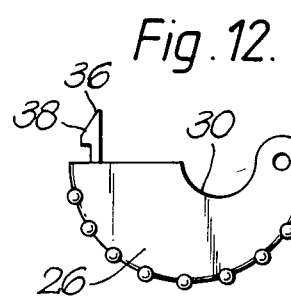

Fig.19.
Fig.20.
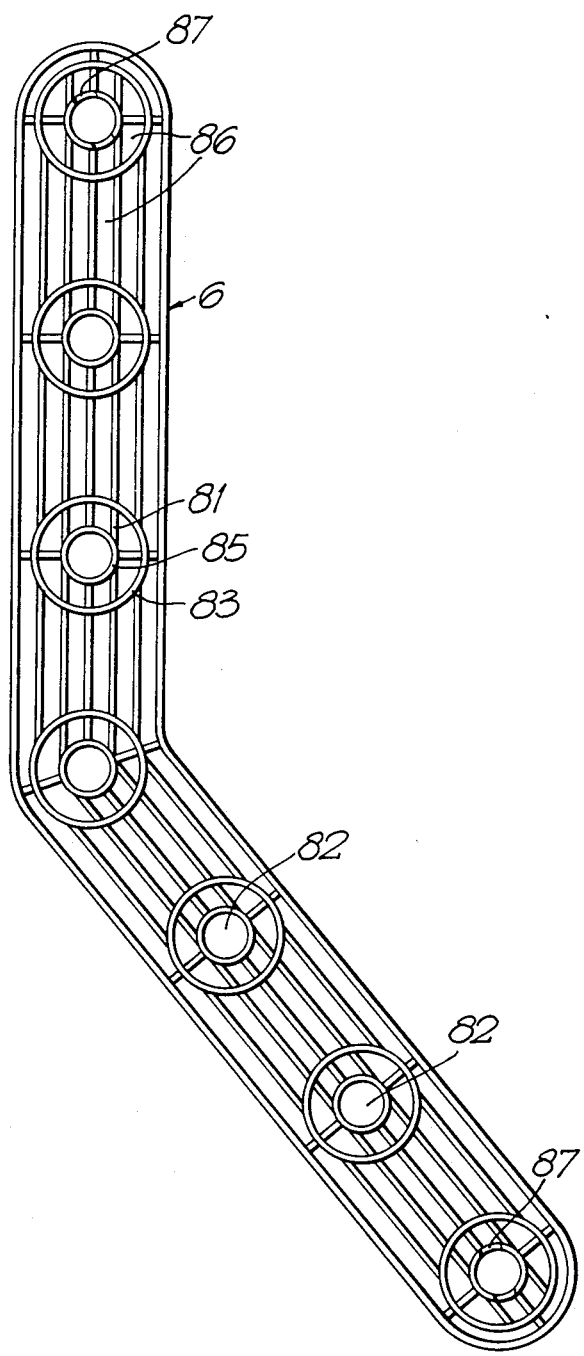
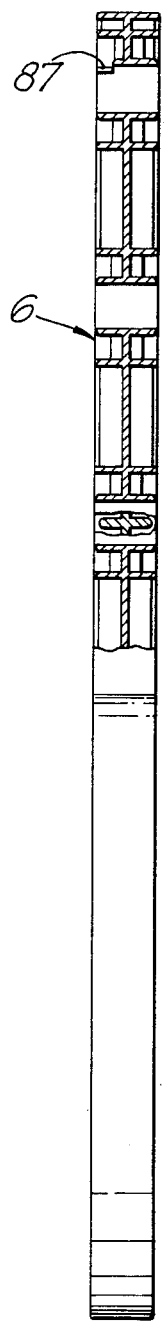

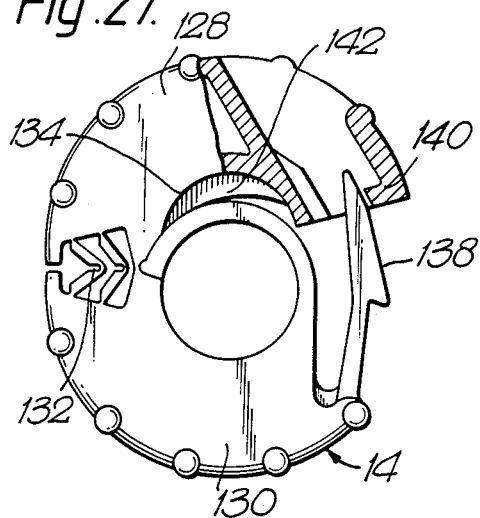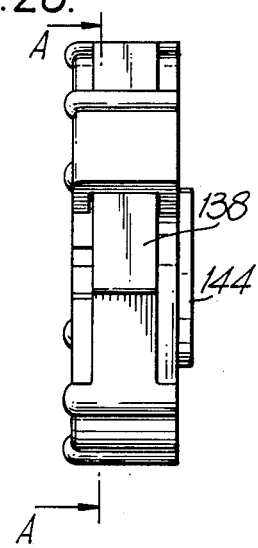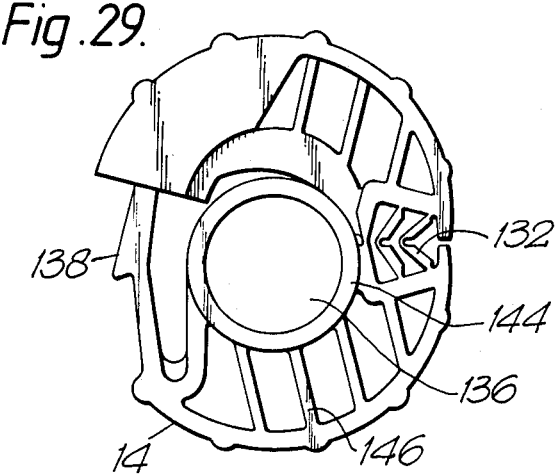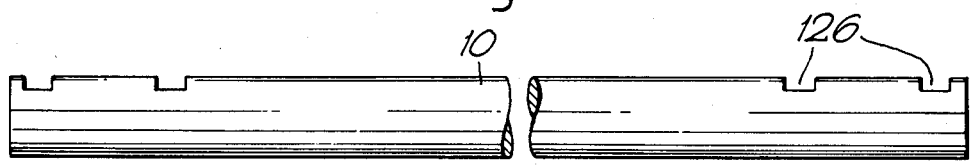

CONVERTIBLE MULTI-PURPOSE TOY

This invention relates to a kit of parts for assembling a number of toy vehicles.

In the past, such kits have had many components and have often required the use of tools during construction, and consequently have been too difficult for young children to use.

A kit of parts for assembling a number of toy vehicles in accordance with the invention comprises at least a bucket, two spine members each having one portion of its length extending at an angle to the other, a support member, three wheels, two axles therefor, and connecting means for all the aforesaid parts, the parts being so constructed and arranged that they may be assembled together, by use of the connecting/attachment means, to form at least a tricycle and a wheelbarrow, the spine members and/or support member being of assembly in at least two different modes/positions relative to the bucket to create the differing toys.

In a preferred embodiment the components of the kit are dimensioned so that the assembled toy vehicle is childsize.

Preferably the support member is substantially Y or T shaped and the leg thereof is bifurcated for at least part of its length.

Suitably the support member includes means for mounting at least one wheel and/or an axle thereto.

Preferably the bucket has an integral seat. Suitably the bucket and the spine members have at least one aperture therein whereby they may be connected to each other and/or to the other components of the kit.

Conveniently the kit also includes a pair of handles and a pair of pedals mounted or adapted to be mounted to at least one of the other components.

Connecting means suitable for connecting two components of the kit of parts for assembling a number of toy vehicles as set out above comprises a hollow peg having a shaft and an enlarged head at one end thereof, the shaft having locking means at its free end, which allow the peg to be pushed through corresponding holes in the two components to be joined and then act to keep the peg in position. extending through the holes, to hold the components together.

A device for attachment to an axle or rod component of a kit of parts as set out above to prevent movement of a second part mounted on the axle or rod comprising two members, each of which has a part recess, the members being hinged together, and having means whereby the members may be secured together with their recess matched to form a circular aperture for receiving and clamping around the axle or rod component.

The kit in accordance with the invention is simple in design and construction and includes only a relatively small number of parts. Each part is capable of at least two different functions and connection in a number of different positions relative to the other components. Consequently a large number of childsize toy vehicles may be quickly and easily assembled without the need of tools.

The invention will be further described by way of example with reference to the accompanying drawings in which:

FIG. 8 is a back view of a support member forming part of the kit;

FIG. 9 is a side view of the support member of FIG. 8.

FIG. 10 is a front view of one part of the support member of FIG. 8;

FIG. 11 is a side view of the support member part shown in FIG. 10;

FIG. 12 is a side view of a second part of the support member of FIG. 8;

FIG. 19 is a side view of a spine member forming part of the kit;

FIG. 20 is a part section taken along the line A—A of FIG. 19;

FIG. 27 is a side view of an attachment means for the kit;

FIG. 28 is an end view of the attachment means of FIG. 27;

FIG. 29 is a part section view taken along the line A—A of FIG. 28

FIG. 30 is a side view of an axle forming part of the kit, and

FIG. 31 is a partially cutaway perspective view showing a lever member and a clamping member in operational assembly.

Figure 1:
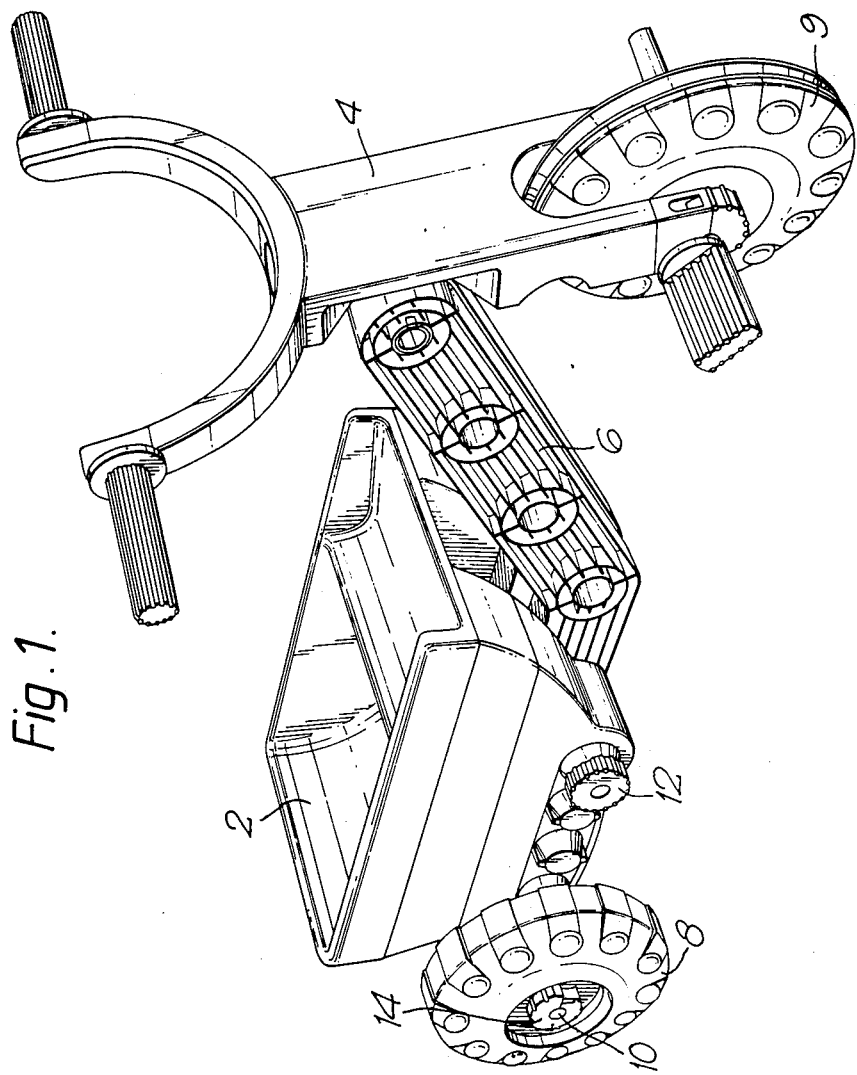
FIG. 1 is a perspective view of a kit in accordance with the invention assembled to form a tricycle.
Figure 2:
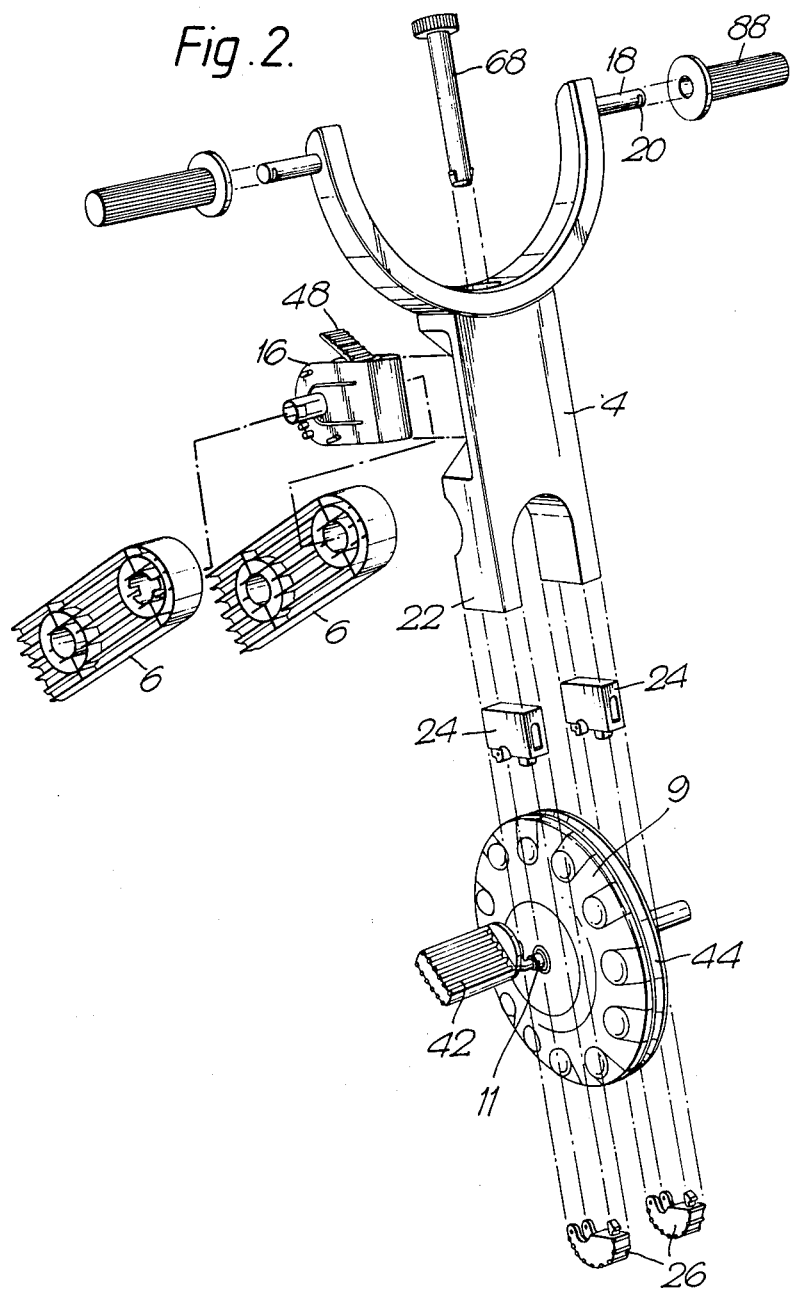
FIG. 2 is an exploded view of one part of the tricycle of FIG. 1.
Figure 3:
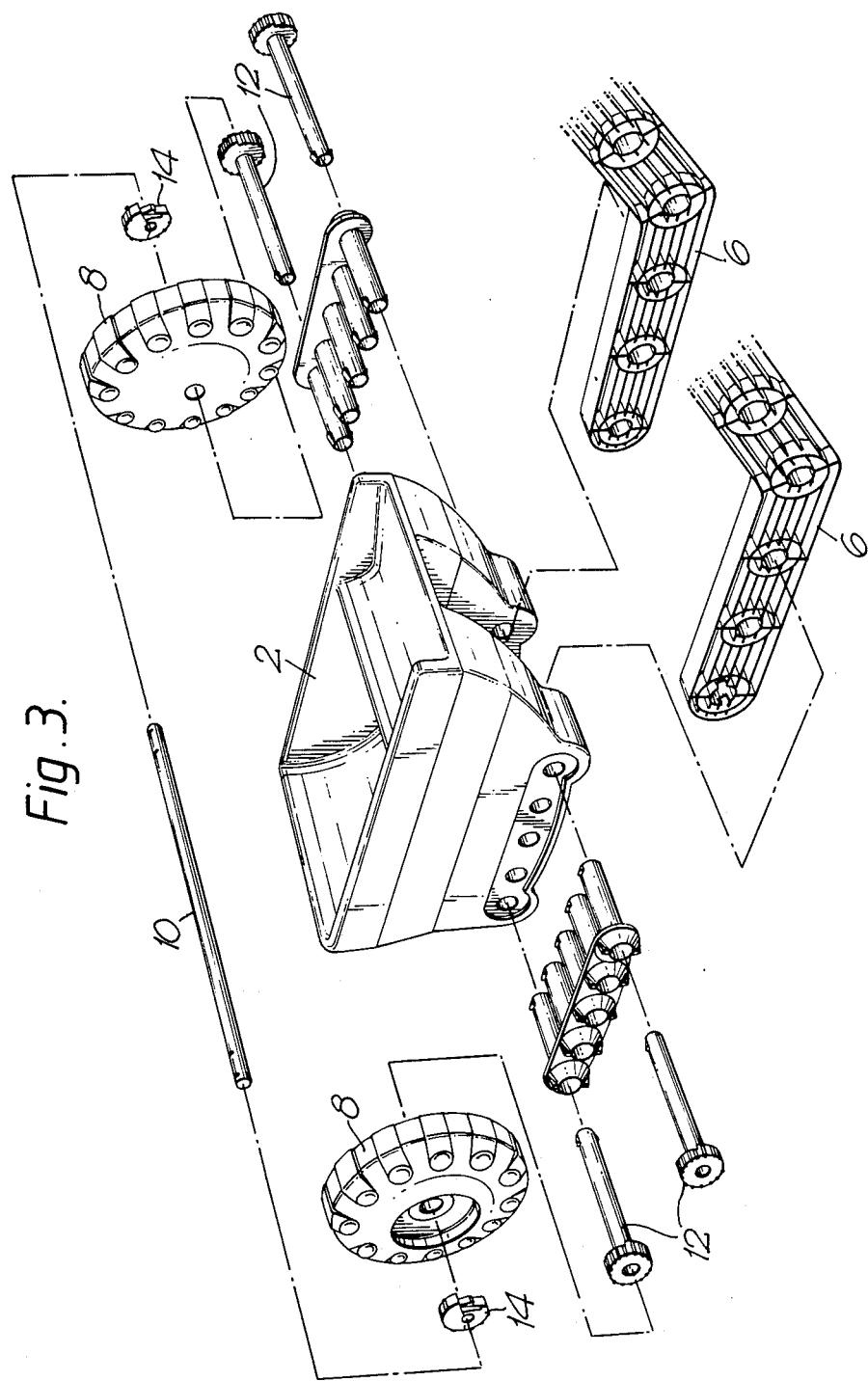
FIG. 3 is an exploded view of the other part of the tricycle of FIG. 1.

FIG. 1 shows a tricycle made up from a kit of components, the assembly of which is shown more clearly in FIGS. 2 and 3 which are exploded views of the front and back respectively of the tricycle. The basic components of the kit are a bucket (2), a support member (4) which in this instance functions as a handlebar and two angled spine members (6). The kit also includes wheels (8, 9) axles (10, 11) and connecting/attachment means (12, 14, 16).

Referring to FIG. 2, the front section of the tricycle comprises the support member (4) to which is connected the two spine members (6) and a wheel (9). The support member (4) is preferably either Y or T shaped and when Y shaped is provided with two integral handle sections (18) as shown in FIG. 2 and in more detail in FIGS. 8 and 9. In either case the support member is provided with two notches (20), near the ends of the handle sections (18) or near the ends of the crossbar when it is T shaped. The support member has forked legs (22) at the ends of which are provided means (23) for mounting an axle.

Referring now in particular to FIGS. 10, 11 and 12 each axle mounting means (23) comprises two mounting members (24 and 26) each of which is provided with a semi-circular recess (2B and 30) in a face thereof. The members are hinged together at (32). The mounting members (24) may be attached to the fork ends of the support member or they may be integrally formed therewith. In either case each mounting member has an aperture (34) in the side distant from the hinge point (32). The mounting members (26) are each provided with latches (36). When the mounting members (26) are rotated about their respective pivot (32) the latches (36) pass into the mounting member (24) through apertures in the base thereof, the sloped surface (38) of the latches (36) riding up the ledge (40) below the apertures (34) so that the latches hook over the ledges (40). In order to release the mounting member (26) it is only necessary to push the latch (through the aperture (34)) to bend it towards the pivot (32) thereby causing it to unlatch.

The circular apertures produced when the mounting members (26) are latched to the mounting members (24) are of the same cross-sectional area as the axles (10). Moreover the length and separation of the forked ends (22) of the support member are such that a wheel may be supported therebetween as is shown in FIGS. 1 and 2. The axle (11) shown therein has two extensions at its ends, perpendicular to the axis of the axle and in opposite directions to which are mounted pedals (42). This axle is preferably integrally formed with the wheel (9) which is provided with a notch (44) around the rim thereof.

The support member (4) is attached to the spine members (6) by connecting means which comprises a clamping member (16) shown in detail in FIGS. 13 to 16. The clamping member with a body (46) has two apertures (50 and 52) and two integrally formed shafts (54 and 56) one end of each of which (58 and 60) lies within the second aperture (52).

The first aperture serves to connect the clamping member to the support member. In this regard the support member (4) has a recess (62), in the portion of its leg above the fork ends, dimensioned so as to receive that part of the body member containing the first aperture (50). A first aperture (64) extends between the recess and the top of the forked ends and a second aperture (66) extends upwardly from the recess through the arms of the support member (4), both apertures being of the same diameter as the first aperture of the clamping member. The two parts are joined by prior means (68), one embodiment of which is described below, which passes through all the apertures (50, 64 and 66) around which the support member can be turned, thereby allowing the child complete directional control of the tricycle.

The shafts (54, 56) of the body member are each provided with four grooves (70) at their ends, two of the regions so formed being provided with wedges (72) integrally formed therewith. The body member (46) has two grooves of an elongated C shape (74) each of which is positioned around the shafts. The inner ends of the shafts each include two slopes (76) (only one of which can be seen) at the highest point of each of which is a recess (78).

The lever member (48) is generally hook shaped, the curve of the hook having two pimples (80) on either side. The clamping member is assembled by passing the curve of the lever member (48) around the ends of the shafts (5B, 60) so that the pimples are positioned at the bottom of the slopes (76). The clamping member is shown in the assembled position in FIG. 2.

The clamping member is connected to the spine members by passing the shafts (54, 56) through apertures (82) in the spine members. The shafts contract as they pass through the apertures until the wedges exit the apertures and then return to their unstressed shape with the wedges latching against the spine members (6) and within locations provided on the spine members described in detail below. The lever member is then rotated causing the dimples (80) to climb up the slopes (76). This pulls the shafts bodily inwardly, the movement being made possible by the C shaped grooves (74), until the dimples (80) locate in the recesses (78) thus locking the lever member (48) relative to the body member (46). In this way the spine members are pulled tightly into the sides of the clamping member. The lever member may be released by rotating it in the opposite direction.

The spine members (6) have equally spaced ribs (81) on the surface thereof running parallel to the axis of the spine member (see FIGS. 19 and 20). The spine members are also provided with two circular ribs (83, 85) centered on each aperture (82) which intersect with the longitudinal ribs (81). The apertures nearest the ends of each spine member (6) have two grooves (87) in the inner circular rib (85) on the same side of the spine member. These grooves receive the wedges (72) of the shafts (54, 56) of the clamping member (16) thus locating the spine members in the correct position relative to the clamping member. The location is aided by means of spigots (84) which are designed so that they fit in the recesses (86) between the longitudinal ribs (81) on the spine members (6).

Figure 17:
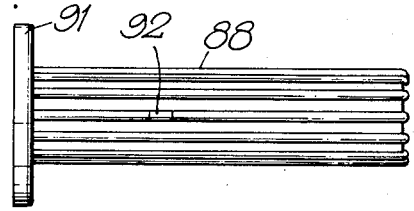
FIG. 17 is a side view of a handle grip forming part of the kit.
Figure 18:
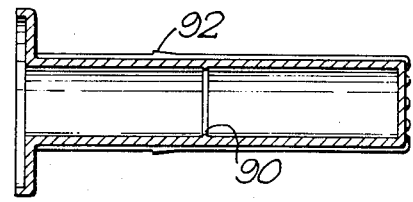
FIG. 18 is a sectional view of the handle grip shown in FIG. 17.

FIGS. 17 and 18 show a handle (88), two of which are suitably included in the kit. The handle (88) is a hollow shaft, of the same outer diameter as the spine member apertures (82), closed at the one end. The handle has a reduced internal cross section at one point along its length (90). This allows it to be fixed to the support member (4) the ring (90) locating in the notch (20). The handle also has two wedges (92) on the outer surface thereof. The handle is made from flexible plastics material and if it is pushed through an aperture in the spine member, the wedges deform and then spring back to lock the handle in place, the distance between the head (91) of the handle and the wedges (92) being equal to the width of the spine members (6).

Figure 21:
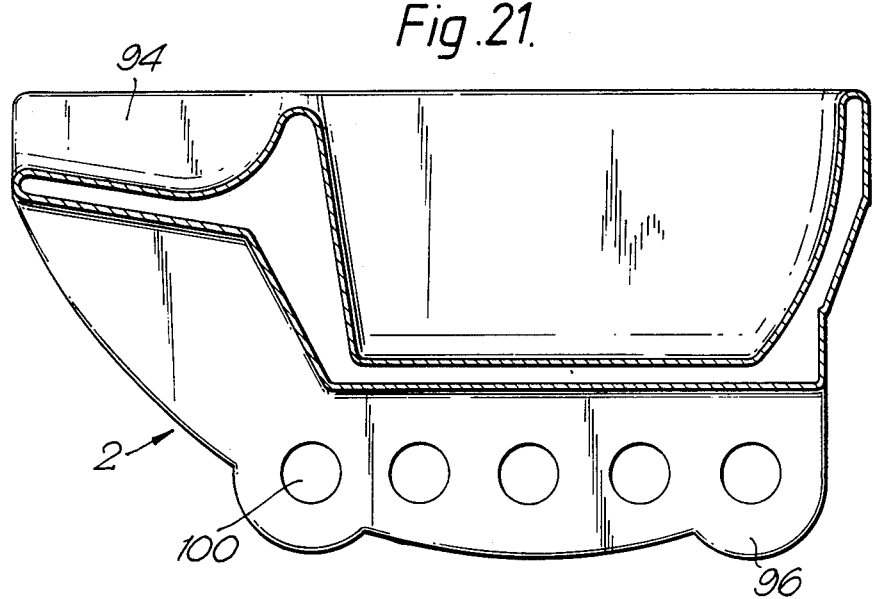
FIG. 21 is a sectional side view of a bucket forming part of the kit.
Figure 22:
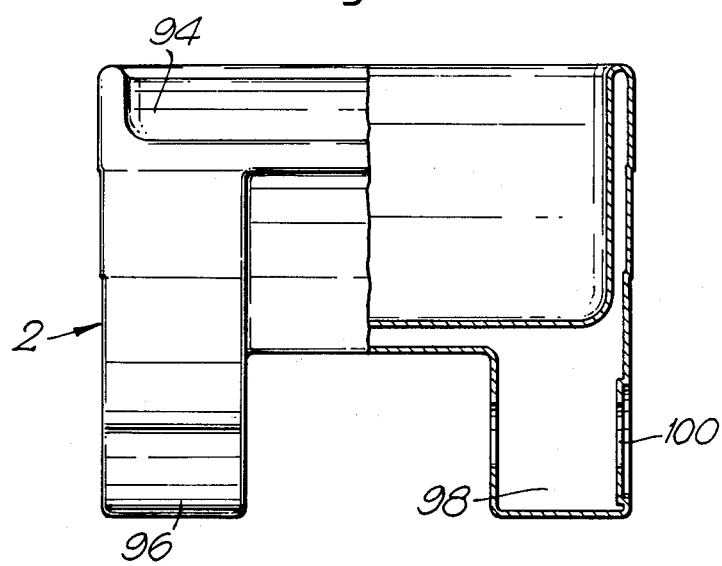
Figure 23:
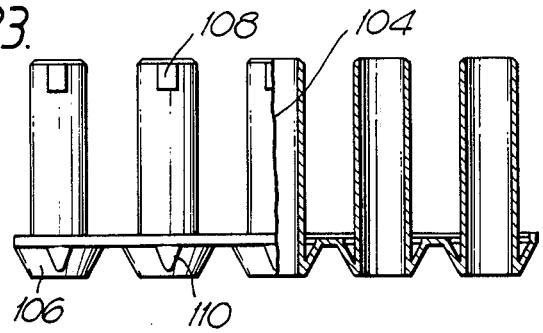
FIG. 23 is a plan view, partly sectioned, of a bucket insert forming part of the kit.
Figure 24:
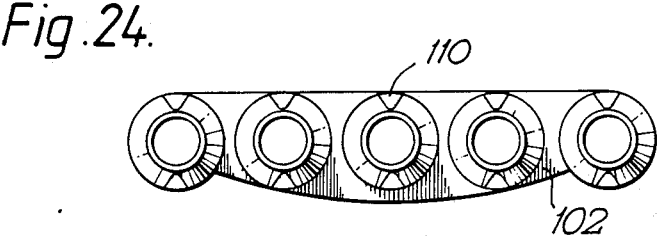
FIG. 24 is a side view of the bucket insert of FIG. 23.

Referring now to FIG. 3 the rear section of the tricycle comprises the bucket (2), spine members (6) and two wheels (8). The bucket, illustrated in FIGS. 21 to 23, has a seat portion (94) and base comprising two integral extensions (96 and 98). The extensions (96 and 98) have apertures (100) therethrough.

Two inserts (102) are preferably provided comprising a series of shafts (104) of the same external diameter, length and spacing as the bucket apertures each of which has a head section (106), the head sections which are frustro conical in shape all being joined together. The shafts all have two wedges (108) at their free ends, positioned diametrically opposite each other. Two triangular projections (110) are provided with their apex adjacent each aperture on the head sections, also positioned diametrically opposite each other. Each insert is attached to a side of the bucket by passing the shafts thereof through the apertures of an integral extension (96 or 98). The shafts contract until the wedges (108) exit the apertures, the wedges then latching against the integral extensions (96,98).

Figure 25:
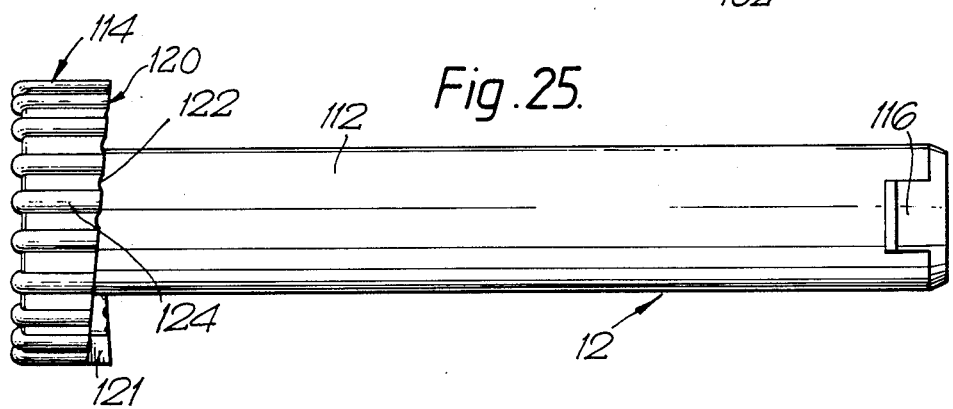
FIG. 25 is a side view of one of the connection means for the kit.
Figure 26:
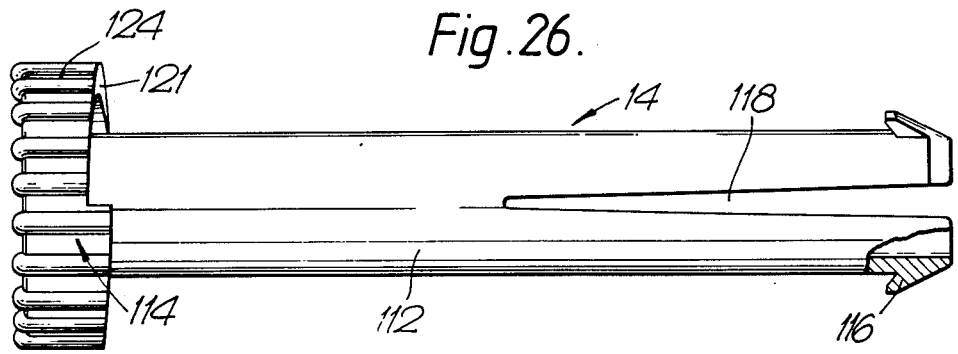
FIG. 26 is a plan view, partly sectioned, of the connecting means of FIG. 25.

The bucket (92) is attached to the spine members (6) by connecting means comprising a peg member (12). For the tricycle the spine members are attached between the two integral extensions (96 and 98) but they may also be attached on either side of the bucket. The peg (12) which is hollow is shown in detail in FIGS. 25 and 26, and comprises a shaft section (112) and a head section (114) at one end thereof. At the other end there are two integrally formed wedges (116) positioned diametrically opposite each other and two slits (118) which extend approximately half the length of the shaft section. The face (120) of the head section is formed with two slopes (121) in opposite directions. Grooves (122) are evenly spaced along the slopes. The head section is formed with a number of ribs (124) to enable the peg to be firmly held when the kit is being assembled.

To connect the bucket (2) to the spine members (6) the peg is inserted through a shaft (104) of the insert (102) and an aperture (82) of the spine member. The slits (118) allow the shaft section to contract until the wedges exit the aperture (82) and latch against the spine member. The peg is then rotated so that the triangular projections (110) on the head section of the shaft (104) locate in a groove (122) in the sloping face of the peg thus tightening the connection.

The embodiment of the pivot means (68) employed to connect the support member (2) to the clamping member and shown in FIG. 2 is similar to the peg although it is closed at the head section and has no tightening means thereon.

The diameter of the shaft section (112) of the peg is equal to that of the apertures (82) of the spine members (6) and the internal diameter of the shafts of the inserts (102). Rather than providing a separate insert the bucket could be formed with integral frustroconical head sections around the apertures therein, in which case the apertures (100) would have a diameter equal to that of the peg (12).

If the spine members are attached to the sides of the bucket rather than between the integral extensions (96, 98) then the peg is passed through an aperture in the spine member and then through a shaft of the insert. The ribs (81) act in the same way as the triangular projections (110) on the inserts locating in the grooves (122) to tighten the connection.

The wheels (8) are mounted on the bucket (2) and spine members (6) by an axle (10) as shown in FIG. 30. The axle is provided with two notches (126) in either end thereof and has a diameter equal to that of the hub and the internal diameter of the peg (12). A number of axles of different lengths are provided to allow their use both as a connection means and to support the wheels.

On each side of the bucket a peg is firstly inserted into the shaft of the insert and an aperture in the spine member to secure these members. The axle is passed through the two pegs and the wheels mounted thereon. The wheels are held in place on the axles by attachment means (14) which is shown in FIGS. 27 to 29 and comprises a bracelet having two semi-circular members (128, 130) which are hinged together by a multiple hinge (132). Both sections have semi-circular recesses (134, 136) in a face thereof. One section is provided with a latch (138) positioned diametrically opposite the hinge (132) whilst the other section is at least partly hollow with a ledge (140) positioned within the hollow portion thereof. The two members (12B, 130) and the hinge (132) are preferably formed as one piece with the bracelet biased open. The bracelet is closed by pushing the two members together causing the sloped surface of the latch (138) to ride up the ledge (140) so that it will hook over the ledge thereby locking the two members together with the semi-circular recesses matched to form a circular aperture of the same diameter as the axle (10). The bracelet is opened by applying pressure on the latch towards the hinge causing it to unhook from the ledge.

The member (128) is provided with a tongue extending (142) from the semicircular recess therein which locates in a notch (126) of the axle (10). The member (130) has a circular rib (144) projecting therefrom and centred on the circular aperture produced when the bracelet is closed. This has an inner diameter equal to that of the axle and an outer diameter equal to that of the apertures in the spine member and the shafts of the bucket inserts. It serves to centre the axle when it is inserted directly into an aperture of the spine members and/or a shaft of the bucket insert and not through a peg as described above. The ribs (146) thereon serve to strengthen it.

The wheel has a recess centered around its hub in which the bracelet sits. The wheel is held away from the bucket by the frustro conical heads of the insert shafts which prevents children from trapping their fingers therebetween.

The components of the kit are all preferably produced from a plastics material: the bucket, the support member and the wheels are suitably produced from a rigid material such as high density polythene; the pegs, bracelets, spine members, pedals, axles, axle mounting means and handles are suitably produced from a more flexible material which should have high impact strength, for example poly propylene and the clamping member is suitably produced from a resilient, high impact strength material such as acetal.

The components are preferably dimensioned such that the assembled toy is of a size to be used by a child. Accordingly the strength of the materials employed must be such that the assembled toy will support the weight of a child.

Described below are some further examples of toys which may be assembled from the kit. The components all function as described in detail above with reference to the tricycle.

Figure 4:
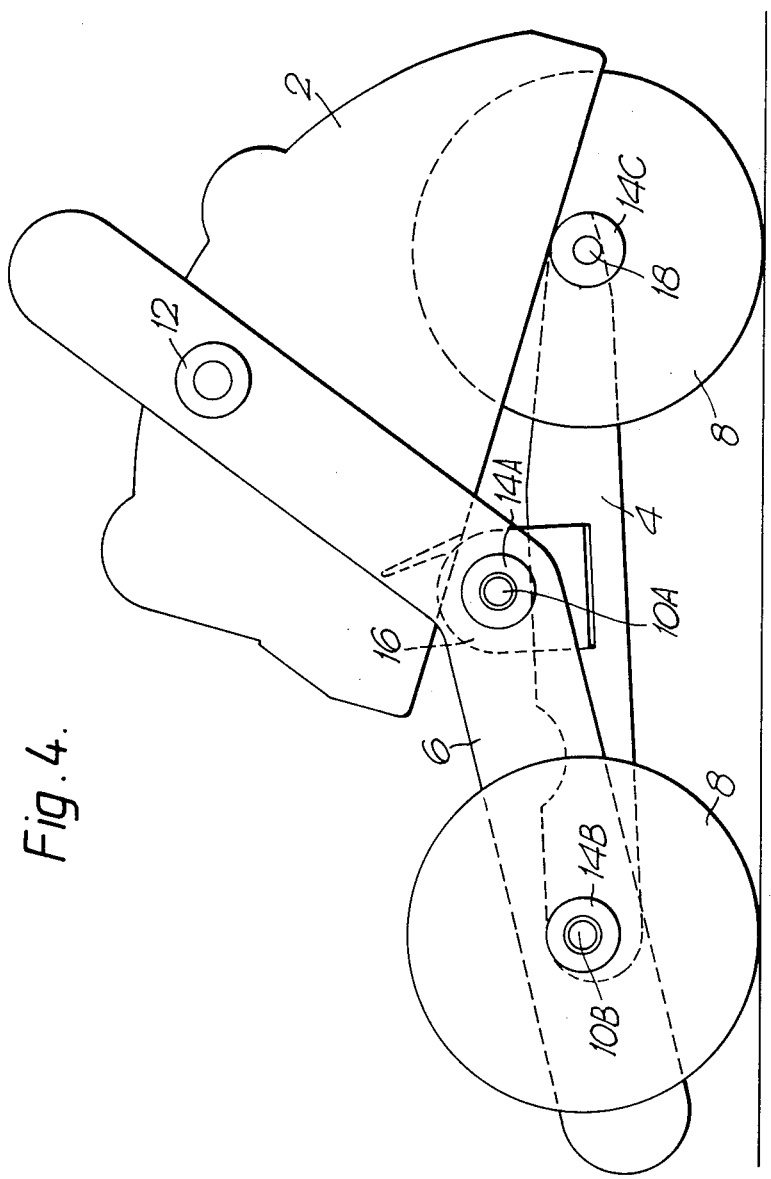
FIG. 4 is a side view of the kit assembled to form a 'spacemobile'.

FIG. 4 shows the components of the kit assembled to form a spacemobile. The bucket (2) is connected to the spine members (6) by pegs (12). An axle (10A) is inserted through the shafts of the clamp and connected to the spine members by bracelets (14A). The support member (4), connected as described above to the clamp (16), has an axle (10B) mounted to its fork ends. Two wheels are mounted on the axle by means of bracelets (14B). The handle section (18) of the support member (2) are used to mount two further wheels which are held in place by bracelets (14C), the tongues (142) of which locate in the notches (20) of the handle sections.

Figure 5:
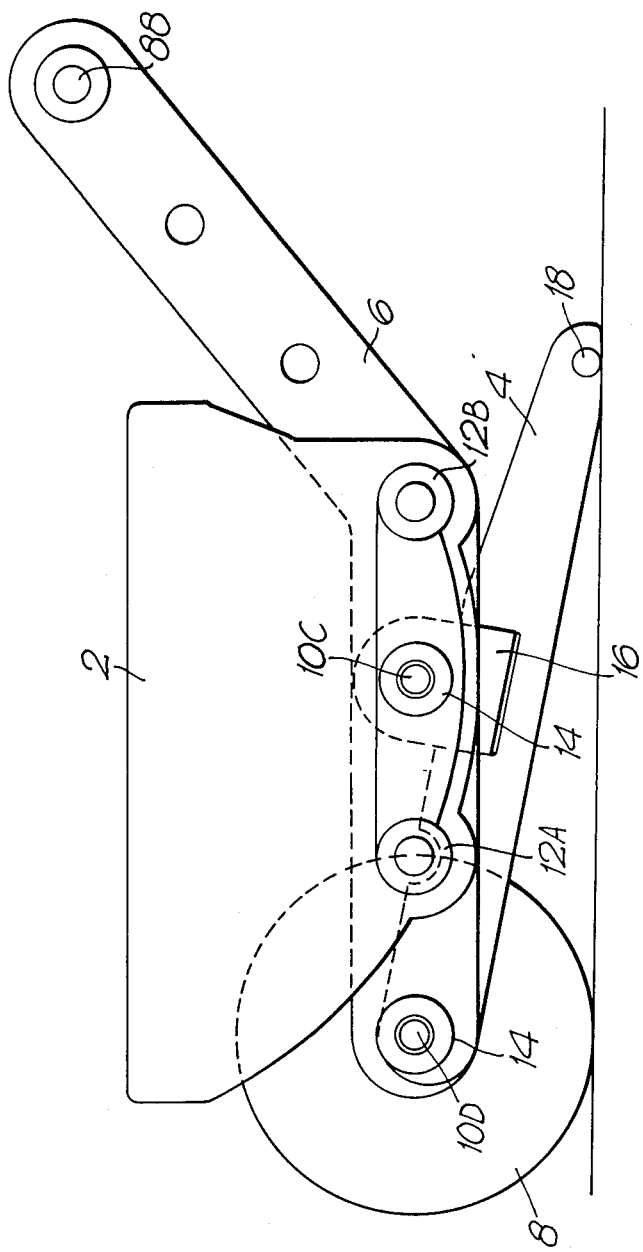
FIG. 5 is a side view of the kit assembled to form a wheelbarrow.

FIG. 5 shows the components of the kit assembled to form a wheelbarrow. the spine members (6) are attached on the sides of the bucket (2) by two pegs (12A+B) and by an axle (10C) which passes through the clamping member shafts, the insert shafts, and the spine member apertures and is held in place by two bracelets. A wheel (8) is mounted between the forked ends of the support member (2) on an axle (10D) which is secured in the spine members by two further bracelets (14). The handle sections (18) of the support member rest on the ground and serve to support the rear of the barrow in its stationary position. The handles (88) are secured in the spine members (6) as described above.

Figure 6:
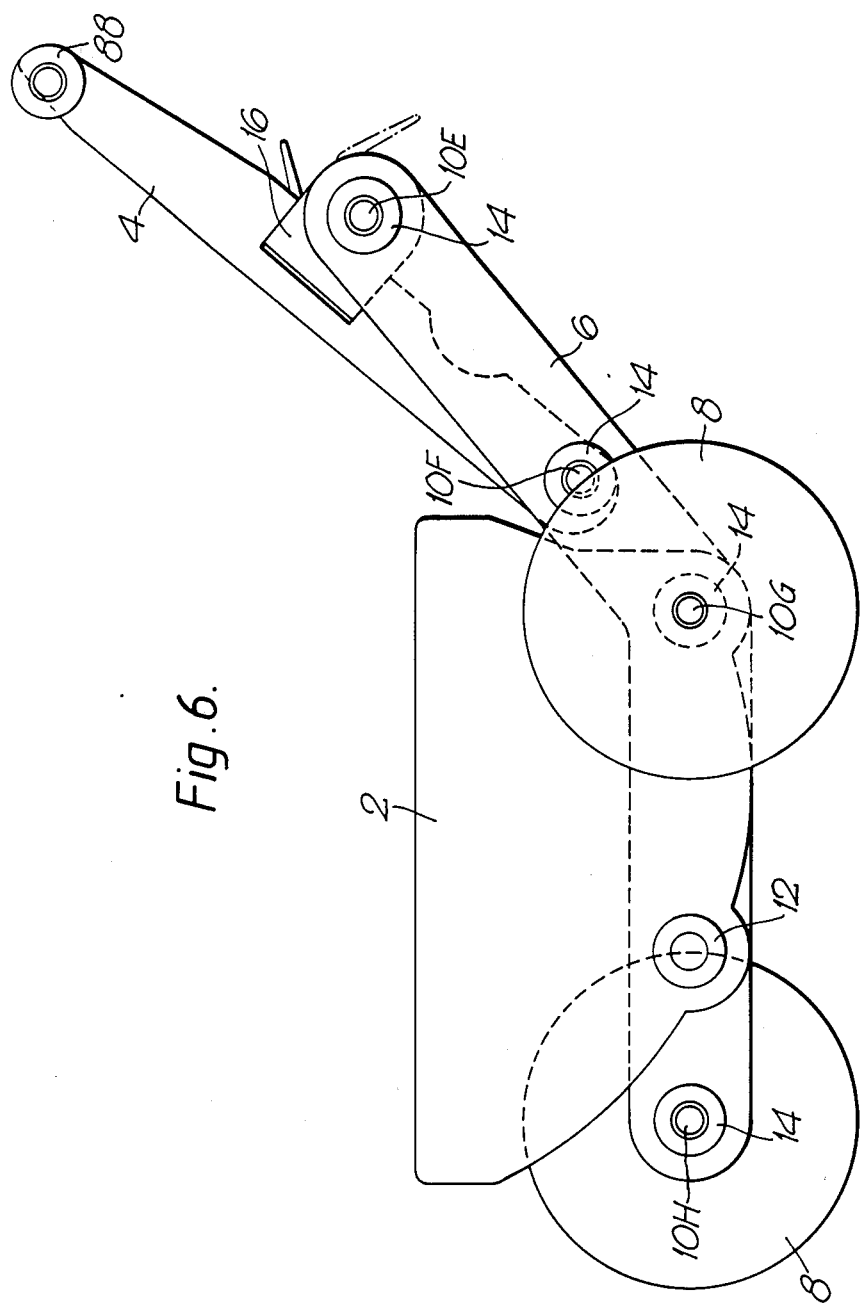
FIG. 6 is a side view of the kit assembled to form a carriage.

FIG. 6 shows the components assembled to form a carriage. The support member (4) acting in this assembly as a handle is attached to the spine members (6) by an axle (10E) passing through the shafts of the clamp (16) and may be further attached by means of a second axle (10F) held at the forked ends of the support member. The spine members are attached to the sides of the bucket. The wheels (8) are supported by two axles (10G+H), two bracelets being employed at each wheel connection. One of the bracelets serves to centre the axle in the spine member aperture while the second serves to hold the wheel on the axle.

Figure 7:
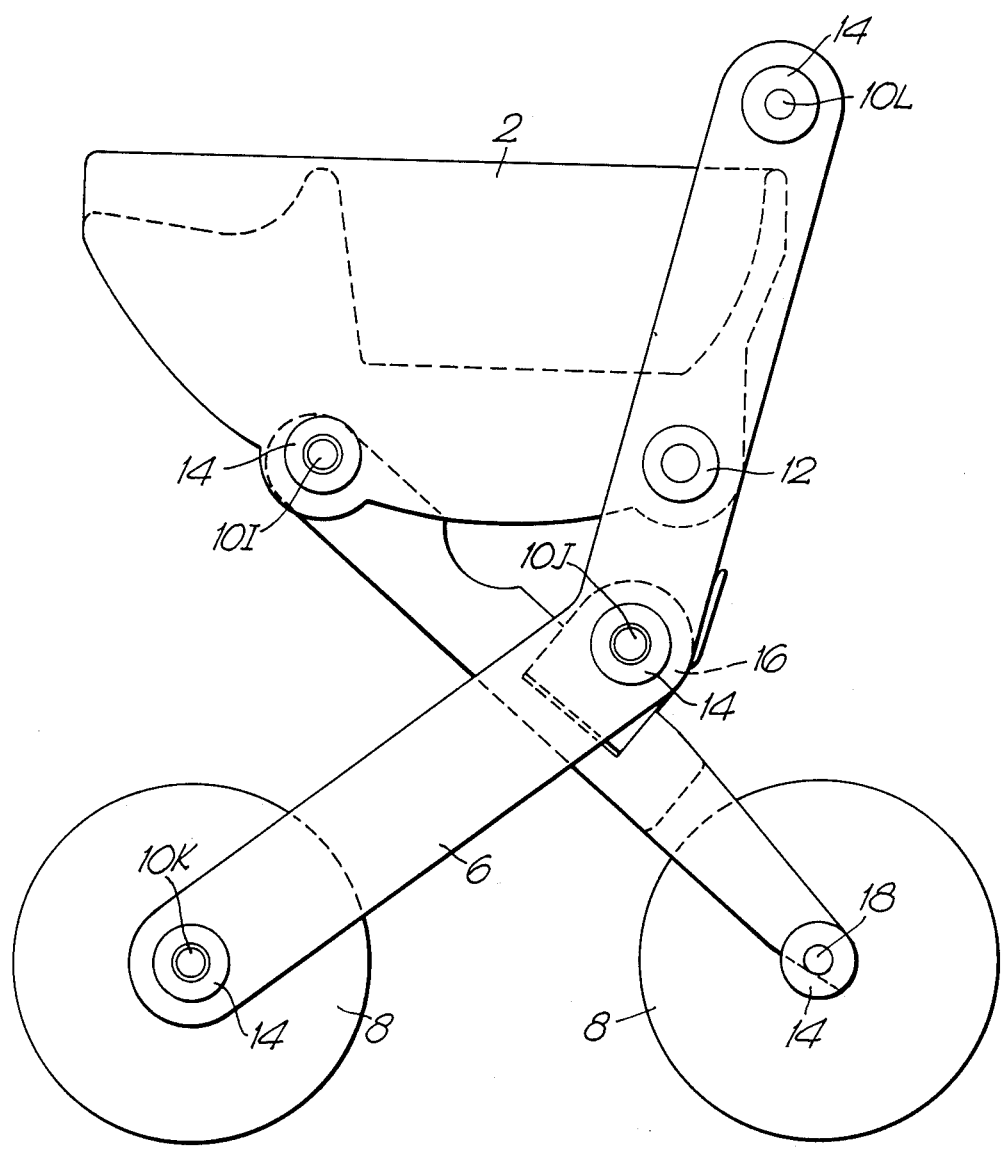
FIG. 7 is a side view of the kit assembled to form a pram.
Figure 13:
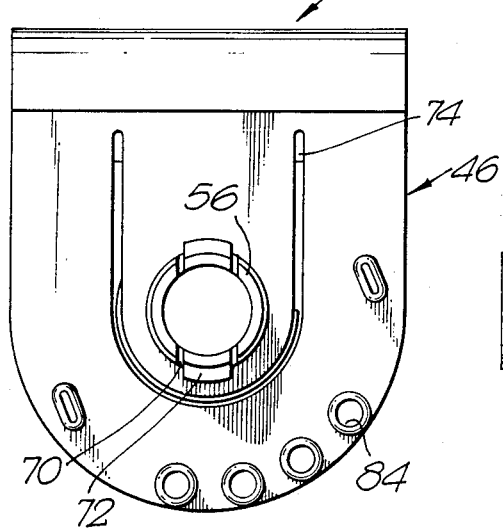
FIG. 13 is a side view of one member of a connecting means forming part of the kit.
Figure 14:
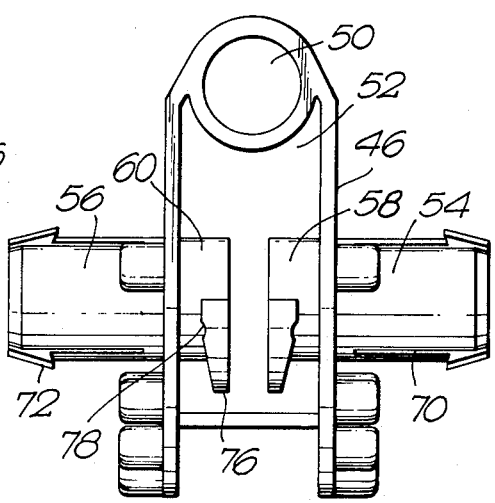
FIG. 14 is a front view of the member shown in FIG. 13.
Figure 15:
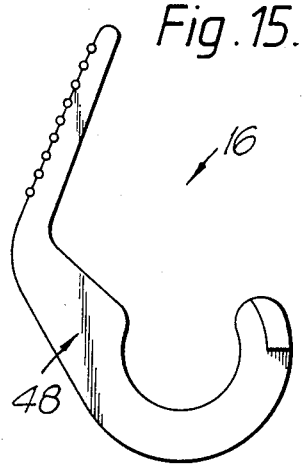
FIG. 15 is a side view of the second member of the connection means forming part of the kit.
Figure 16:
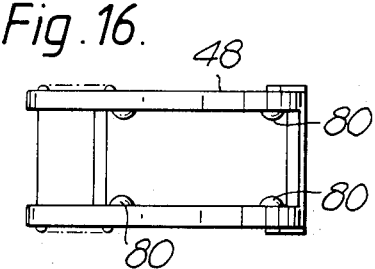
FIG. 16 is a plan view of the member of FIG. 15.

FIG. 7 shows the components of the kit assembled to form a pram/trolley. The support member (4) is attached to the bucket by an axle (101) mounted on its forked ends and secured to the bucket by bracelets (14). The support member is attached to the spine members (6) by a second axle (10J) which is held in the shafts of the clamping member and secured to the spine members by bracelets. The handle sections (18) of the support member are used to mount two wheels as described above.

The spine members are connected to the bucket by pegs (12) and support two further wheels by way of an axle (10K). A fourth axle (10L) is connected between the free ends of the spine members by bracelets to allow a child to push the pram.

The arrangements described above are only a few of those which can be made from the kit. All can be assembled and dismantled in a simple fashion but produce a toy which is sufficiently robust to be actively used by a child. The versatility of the kit is due to the capability of each part to perform at least two functions and to the fact that the spine members and/or the support member may be assembled in at least two different modes or positions relative to the bucket. Moreover the kit with suitable additional components could be assembled to form other arrangements such as, for example, a see-saw or, with the addition of a suitable piece of canvas, a deck chair, tent, sledge or slide.

What we claim is:

1. A kit of parts for assembling at least a tricycle, a cart and a wheelbarrow, said kit comprising
    a bucket,
    two spine members connectable to said bucket, each spine member having one portion of its length extending at an angel to another portion of its length, said spine members being aligned side by side when assembled and in parallel relationship along their entire lengths,
    a support member connectable to said aligned spine members,
    three wheels each mountable on an axle, said axles being connectable with said spine members and said support member,
    structure defining at least one aperture in each of said bucket and said spine members, said apertures permitting said bucket and said spine members to be connected to at least one of each other and the support member, and
    connectors cooperable with said bucket, spine members, support member and wheel axles for holding same in assembled relation, said connectors being selected from a group consisting of at least one of
    a hollow peg having a shaft and an enlarged head at one end thereof, said shaft having a lock at its free end which allow said peg to be pushed through a corresponding aperture in said bucket and one of said spine members to hold said bucket and spine member together, and
    a bracelet mountable on a wheel axle, said bracelet comprising two members each of which has a circular recess part, and a latch for securing said two members together with their recess parts matched to form a circular aperture for receiving and clamping around said axle,
    said kit of parts being adapted for interconnection so as to permit assembly of said spine members and said support member in at least two different positions relative to said bucket in order to create either said tricycle or said wheelbarrow or said cart, said support member providing ground support when said kit of parts is assembled as a wheelbarrow and providing steering when said kit of parts is assembled as a tricycle.

2. A kit as claimed in claim 1, said bucket comprising an integral seat formed as part of said bucket.

3. A kit as claimed in claim 1 comprising
    a pair of handles and a pair of pedals, said handles and pedals being mountable on at least one of the other kit parts.

4. A kit as claimed in claim 1, said kit parts being dimensioned so that said tricycle and wheelbarrow are child size.

5. A kit as claimed in claim 1, said support member being substantially Y-shaped at one end.

6. A kit as claimed in claim 5, said Y-shaped end of said support member comprising
    arms capable of mounting at least one wheel.

7. A kit as claimed in claim 6, said support member being bifurcated at the other end, and said support member comprising
    releasable locking means at said bifurcated end for mounting an axle.

8. A kit as claimed in claim 7, said peg comprising
    two slits diametrically opposite each other on said shaft, said slits extending from the free end of said shaft along at least part of its length to allow said shaft to contract when said peg is pushed through an aperture so as to aid the movement of said wedges towards each other.

9. A kit as claimed in claim 8, said peg comprising
    a cam surface defined on a face of said head, said cam surface cooperating with one component within which an aperture is formed so that rotation of said peg after it is extended through said aperture causes said cam surface to pull said wedges toward said one component, and
    at least one recess formed on said cam surface for receiving a corresponding projection provided on that one component to secure said peg in its tightened position.

10. A kit as claimed in claim 1, one of said bracelet members comprising means to aid in locating that one of said bracelet members relative to the other of said bracelet members.

11. A kit as claimed in claim 10, one of said bracelet members comprising
   an integral projection that extends into that circular recess part formed in the other of said bracelet members, and that extends into a depression formed in said axle, when both said bracelet members are secured together to aid in clamping said bracelet around said axle.

12. A kit as claimed in claim 11, said two bracelet members being hinged together by an integral hinge.

13. A kit of parts for assembling at least a tricycle, a cart and a wheelbarrow, said kit comprising
   a bucket, said bucket constituting said tricycle's seat when said kit is assembled as a tricycle and said bucket constituting said wheelbarrow's container when said kit is assembled as a wheelbarrow,
   two spine members connectable to said bucket, each spine member having one portion of its length extending at an angle to another portion of its length, said spine members being aligned side by side in parallel fashion along their entire lengths when assembled,
   a support member connectable to said aligned spine members, the support member providing steering when said list of parts is assembled as a tricycle and providing ground support when said kit of parts is assembled as a wheelbarrow,
   three wheels each mountable on an axle, said axles being connectable with said spine members and said support member,
   structure defining at least one aperture in each of said bucket and said spine members, said apertures permitting said bucket and said spine members to be connected to at least one of each other and the support member, and
   connectors cooperable with said bucket, spine members, support member and wheel axles for holding same in assembled relation.

14. A kit as claimed in claim 13, said support member being substantially Y-shaped at one end, said Y-shaped end of said support member comprising
   arms capable of mounting at least one wheel.

15. A kit as claimed in claim 13, said support member being bifurcated at the other end, and said support member comprising
   releasable locking means at said bifurcated end for mounting an axle.

16. A kit as claimed in claim 1, said peg comprising
   two wedges positioned diametrically opposite each other on said shaft, said wedges being resiliently mounted so that they move towards each other on pushing said peg through an aperture, and so that they resume their unstressed position to prevent the free end of said peg from being withdrawn on emerging from said aperture after being pushed through said aperture.

17. A kit as claimed in claim 13, said connectors being selected from a group consisting of at least one of
   a hollow peg having a shaft and an enlarged head at one end thereof, said shaft having a lock at its free end which allows said peg to be pushed through a corresponding aperture in said bucket and one of said spine members to hold said bucket and spine member together, and
   a bracelet mountable on a wheel axle, said bracelet comprising two members each of which has a circular recess part, and a latch for securing said two members together with their recess parts matched to form a circular aperture for receiving and clamping around said axle, said kit of parts being adapted for interconnection so as to permit assembly of said spine members and said support member in two different positions relative to said bucket in order to create either said tricycle or said wheelbarrow.

18. A kit as claimed in claim 17, one of said bracelet members comprising at least one of
   means to aid in locating that one of said bracelet members relative to the other of said bracelet members, and
   an integral projection that extends into that circular recess part formed in the other of said bracelet members, and that extends into a depression formed in said axle, when both said bracelet members are secured together to aid in clamping said bracelet around said axle.

19. A kit as claimed in claim 17, said peg comprising
   two wedges positioned diametrically opposite each other on said shaft, said wedges being resiliently mounted so that they move towards each other on pushing said peg through an aperture, and so that they resume their unstressed position to prevent the free end of said peg from being withdrawn on emerging from said aperture after being pushed through said aperture, and
   two slits diametrically opposite each other on said shaft, said slits extending from the free end of said shaft along at least part of its length to allow said shaft to contract when said peg is pushed through an aperture so as to aid the movement of said wedges towards each other.

20. A kit as claimed in claim 19, said peg comprising
   a cam surface defined on a face of said heat, said cam surface cooperating with one component within which an aperture is formed so that rotation of said peg after it is extended through said aperture causes said cam surfaces to pull said wedges toward said one component, and
   at least one recess formed on said cam surface for receiving a corresponding projection provided on that one component to secure said peg in its tightened position.

* * * * *

UNITED STATES PATENT AND TRADEMARK OFFICE
CERTIFICATE OF CORRECTION

PATENT NO. : 4,865,337

DATED : September 12, 1989

INVENTOR(S) : Martin R. Disler et al.

It is certified that error appears in the above-identified patent and that said Letters Patent is hereby corrected as shown below:

Column 9, line 53, change "16." to --8.--.

Column 9, line 53, claim 8 should be inserted in Column 8, between line 48 and line 49

Column 8, line 49, delete "8" and insert --9--; delete "claim 7" and insert --claim 8--

Column 8, line 56, delete "9" and insert --10--; delete "claim 8" and insert "claim 9"

Column 8, line 67, delete "10" and insert --11--

Column 9, line 4, delete "11" and insert --12--; delete "claim 10" and insert --claim 11--

Column 9, line 12, delete "12" and insert --13--; delete "claim 11" and insert --claim 12--

Column 9, line 15, delete "13" and insert --14--

Column 9, line 44, delete "14" and insert --15--; delete "claim 13" and insert --claim 14--

UNITED STATES PATENT AND TRADEMARK OFFICE
CERTIFICATE OF CORRECTION

PATENT NO. : 4,865,337

DATED : September 12 1989

INVENTOR(S) : Martin R. Disler et al

It is certified that error appears in the above-identified patent and that said Letters Patent is hereby corrected as shown below:

Column 9, line 48, delete "15" and insert --16--; delete "claim 13" and insert --claim 14--

Signed and Sealed this

Third Day of March, 1992

Attest:

HARRY F. MANBECK, JR.

Attesting Officer

Commissioner of Patents and Trademarks